United States Patent [19]

Engler, Jr.

[11] Patent Number: 5,447,403
[45] Date of Patent: Sep. 5, 1995

[54] DEXTEROUS PROGRAMMABLE ROBOT AND CONTROL SYSTEM

[76] Inventor: Charles D. Engler, Jr., 100 9th St. Apt. 106, Laurel, Md. 20707

[21] Appl. No.: 68,265

[22] Filed: May 28, 1993

Related U.S. Application Data

[63] Continuation-in-part of Ser. No. 700,316, May 9, 1991, abandoned, which is a continuation of Ser. No. 461,592, Jan. 5, 1990, abandoned.

[51] Int. Cl.⁶ .............................................. B25J 3/04
[52] U.S. Cl. ........................................ 414/4; 901/28; 901/39; 901/21; 623/62; 294/111
[58] Field of Search ............... 414/4, 5; 901/23, 25, 901/28, 29, 30, 38, 21, 39, 26; 294/111, 106, 115; 623/21, 57, 64, 59

[56] References Cited

U.S. PATENT DOCUMENTS

| | | | |
|---|---|---|---|
| 1,484,913 | 2/1924 | Surry | 623/57 X |
| 3,694,021 | 9/1972 | Mullen | 294/106 |
| 4,246,661 | 1/1981 | Pinson | 3/1.1 |
| 4,302,138 | 11/1981 | Zarudiansky | 414/5 |
| 4,575,297 | 3/1986 | Richter | 414/5 |
| 4,921,293 | 5/1990 | Ruoff et al. | 414/729 |
| 4,922,755 | 5/1990 | Oshiro et al. | 901/26 X |
| 4,986,723 | 1/1991 | Maeda | 414/729 |

FOREIGN PATENT DOCUMENTS

| | | | |
|---|---|---|---|
| 543532 | 6/1922 | France | 623/57 |

OTHER PUBLICATIONS

"Mechanical Arm Gives Robots A Helping Hand," Machine Design, vol. 61, No. 1, Jan. 12, 1989, p. 16.

Charles D. Engler, Jr., "Design and Development of an Anthropomorphic Electro-mechanical Hand with Exoskeletal Control for Reproduction of Human Hand Dexterity," Lehigh University School of Industrial Engineering, Apr. 1989.

"Effect of Hand-Based Sensors on Manipulator Control Performance", Mechanism and Machine Theory, 1977, vol. 12, pp. 547-567.

*Primary Examiner*—Donald W. Underwood
*Attorney, Agent, or Firm*—Robert D. Marchant; Guy M. Miller

[57] ABSTRACT

An anatomically correct, humanlike, mechanical arm and hand is provided that an operator can control to perform with the dexterity and compliance of a human hand. Being humanlike and robotic enhances the device's control and gripper dexterity. Control of the movement of the arm and hand is performed or guided by a "teachglove" worn by the operator. As he or she performs some hand manipulation, a controller stores signals from sensors on the exoskeleton. The sensors monitor the operator's finger-joint movement positions. These values are later translated into actuator control signals for servomotors, eventually duplicating the operator's movement.

14 Claims, 17 Drawing Sheets

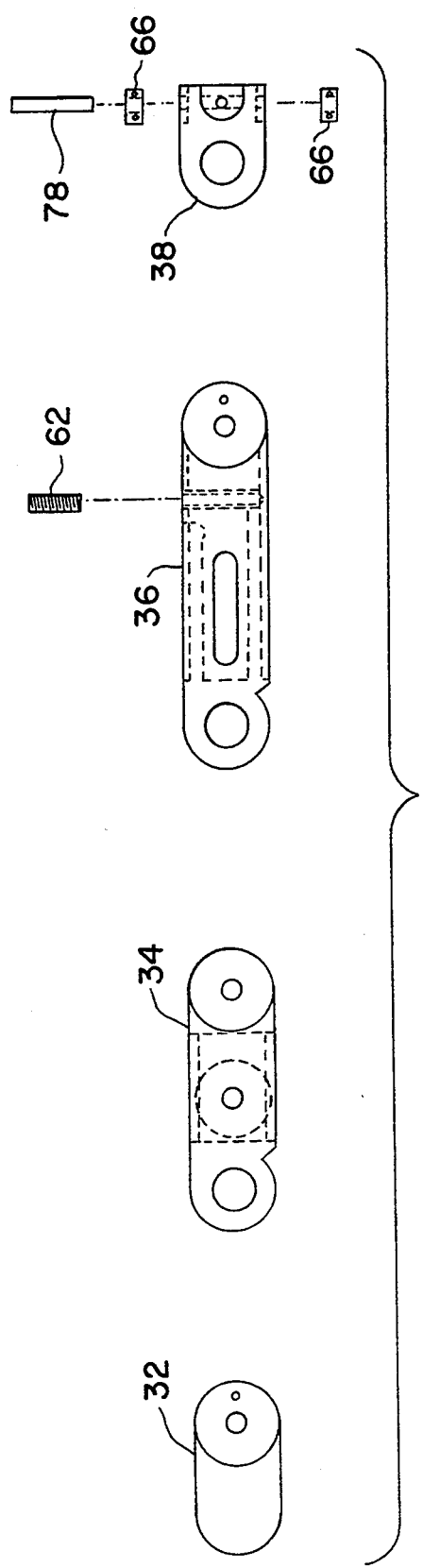
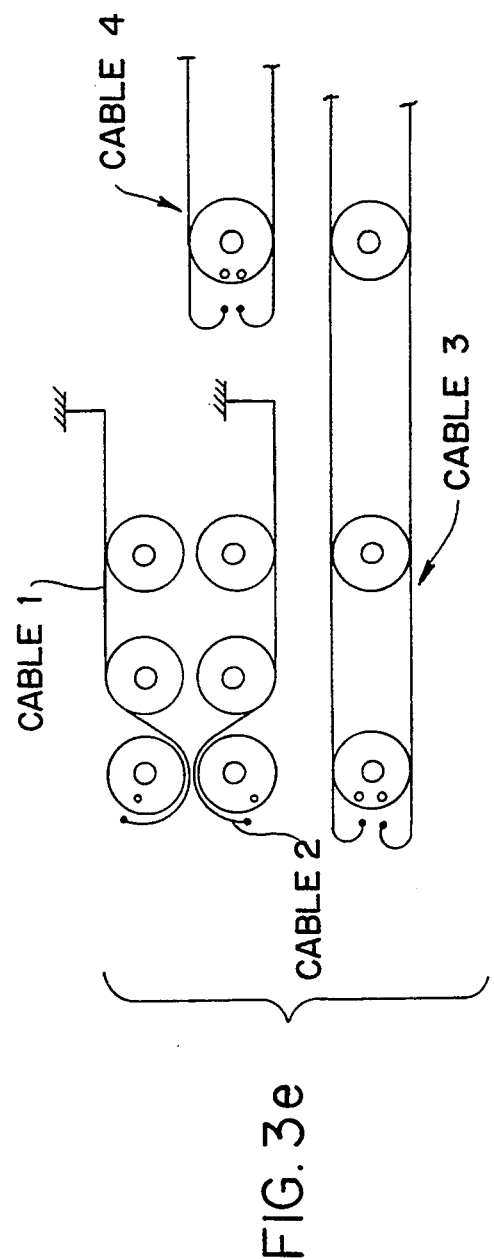
FIG. 3c
FIG. 3e

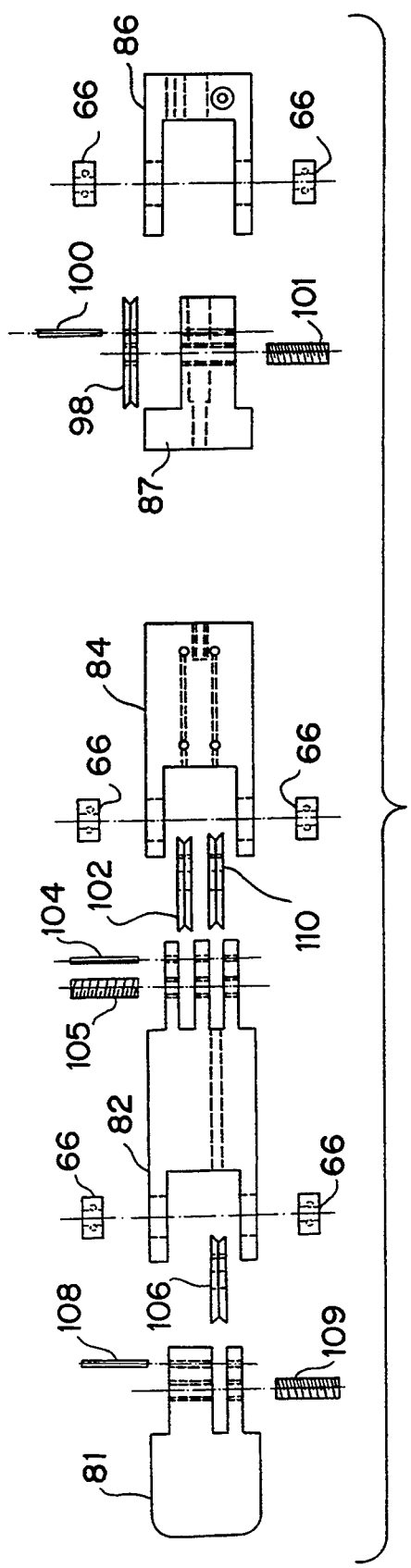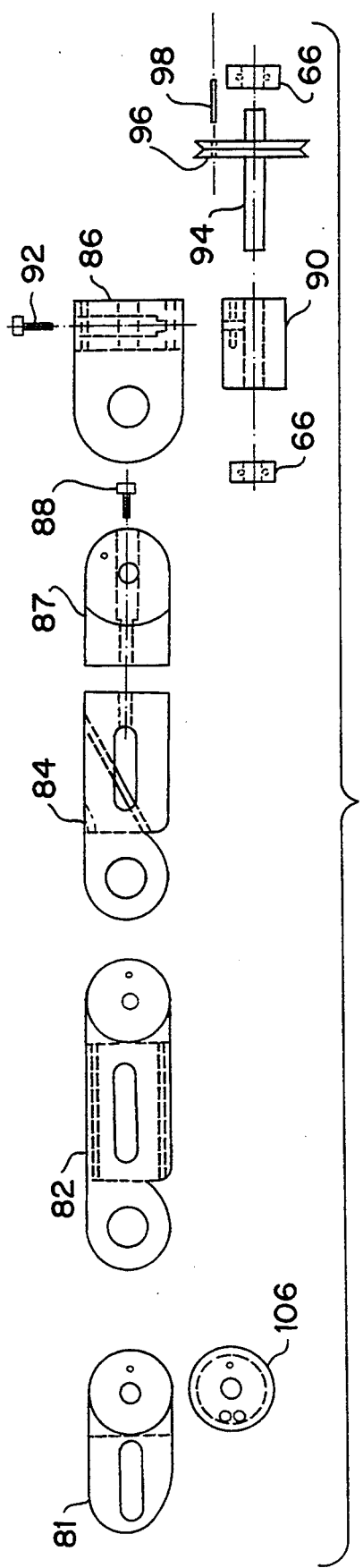

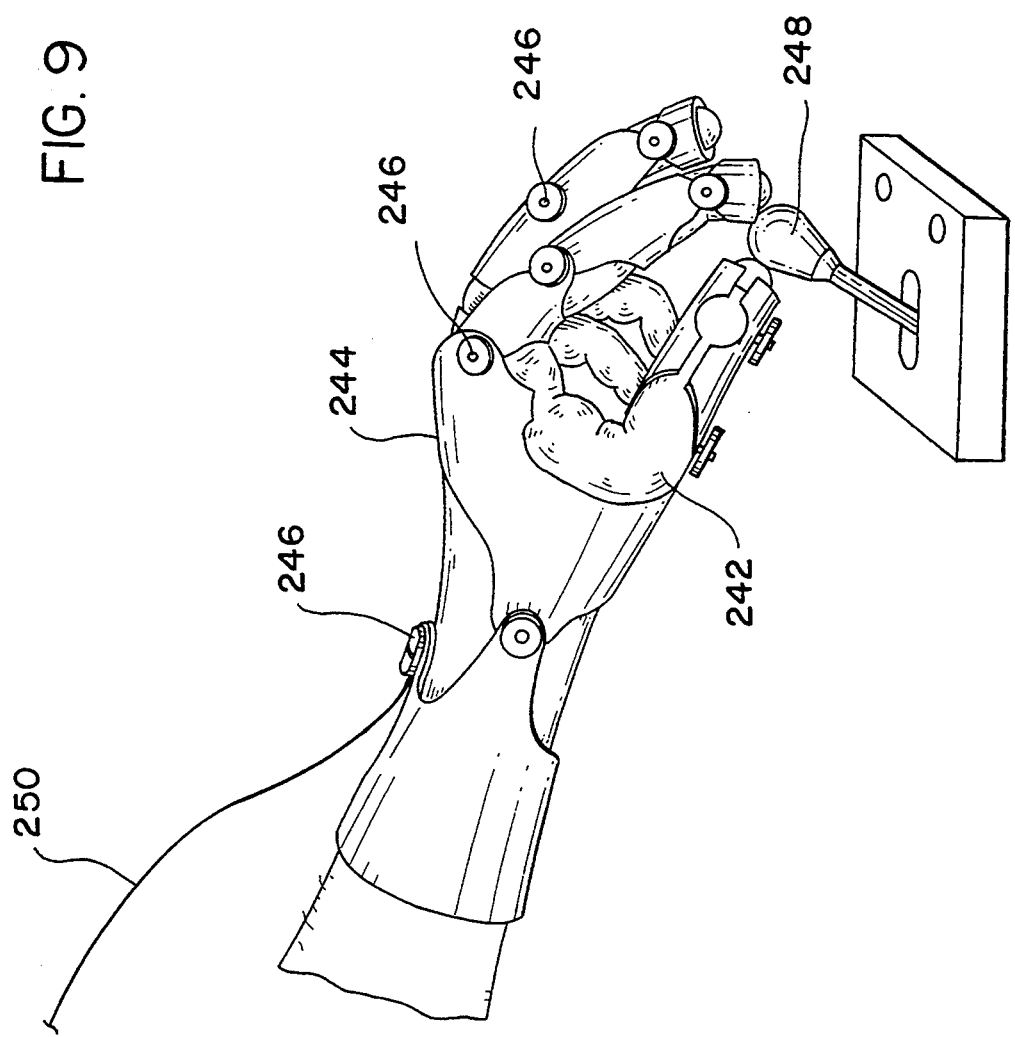

DEXTEROUS PROGRAMMABLE ROBOT AND CONTROL SYSTEM

ORIGIN OF THE INVENTION

The invention describe herein was made by an employee of the United States Government and may be manufactured and used by or for the Government for governmental purposes without the payment of any royalties thereon or therefore.

This application is a continuation-in-part of application Ser. No. 07/700,316, filed May 9, 1991, now abandoned, which is a continuation application of application Ser. No. 07/461,592, filed Jan. 5, 1990, now abandoned.

TECHNICAL FIELD

This invention relates to a robotic hand and forearm and more specifically to an anatomically correct, dexterous, programmable robotic hand including a wrist, forearm and the control system for operating the robotic hand.

BACKGROUND ART

Much work has occurred in the fields of robotics, telerobotics and prosthetics to develop a mechanical or robotic hand that will simulate the movements, grasping ability and dexterity of a human hand and also have the anatomical characteristics and relative size of a human hand. However, most artificial, prosthetic or robotic arm and hand devices have limitations in that they do not possess the attributes or qualities that comprise the human hand. Thus, simulation of precisioned movements of the fingers, thumb, wrist and forearm of a human being are not possible. The devices that are presently available that can simulate human hand movements are usually very complex designs that are expensive to build. However, there are no relatively inexpensive devices that are anatomically correct in modeling the design of a human hand for precise and controlled movement in all the degrees of motion of the human hand. Both lateral and rotationally bending movement of the fingers, as well as individual independent movement of finger and thumb links, is possible, resulting in the ability to grasp an object with a high degree of precision.

STATEMENT OF THE INVENTION

It is therefore an object of the present invention to provide a robotic hand that simulates a human hand in both appearance and operation.

It is another object of the present invention to provide a robotic hand that is anatomically correct and proportional in shape to a human hand.

It is a further object of this invention to provide an artificial or robotic hand that can be controlled and manipulated by a human hand by the use of an exoskeletal teaching glove.

It is still another object of this invention to provide a robotic hand that can be used for the purpose of remote handling of objects.

It is still a further object of this invention to provide a robotic hand that can be used for the purpose of handling of objects in hazardous or dangerous environments.

It is another object of this invention to provide an artificial or robotic hand that renders the fingers and thumb easily operable and capable of grasping objects with substantial strength, if needed, and then releasing the objects.

It is a further object of this invention to provide a robotic hand in which the controlled movement of an individual finger link such as in a human hand is possible.

It is still another object of this invention to provide a robotic hand in which precise, controlled rotational bending of the fingers lateral and vertical movement as well as rotational movement is possible.

The foregoing objects can be accomplished by providing an anatomically correct, humanlike, mechanical hand and arm that an operator can control to perform with the dexterity and compliance of a human hand. Being humanlike and robotic enhances the device's control and gripper dexterity. Control of the movement of the hand and arm is performed or guided by a "teach-glove" worn by the operator. As he or she performs some hand manipulation, a controller reads or uses the angular position of each joint from the exoskeletal glove. Positions are later translated into actuator control signals for servomotors, which by virtue of the mechanisms's anatomically correct proportions, duplicate the operator's movement.

BRIEF DESCRIPTION OF THE DRAWINGS

FIG. 3C is an exploded view of the components shown in FIG. 3A.

FIG. 3E is a schematic view showing the cable routing scheme for the various cables that control the motion of the finger.

FIGS. 4B and 4C are exploded two dimensional views of the components shown in FIG. 4A.

FIG. 9 is a pictorial view of the teachglove.

DETAILED DESCRIPTION OF THE INVENTION

Figure 1A:
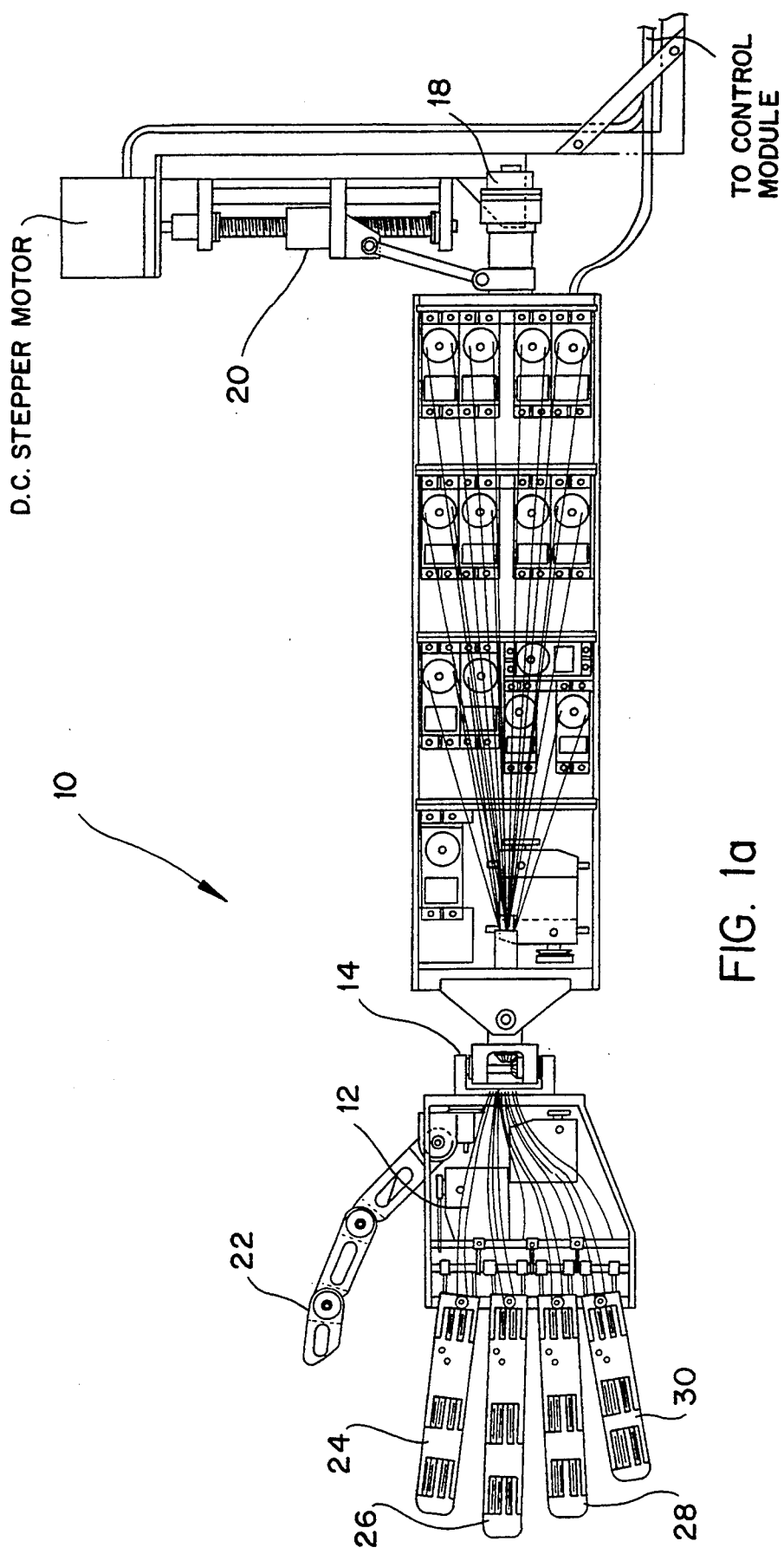
FIG. 1A represents a schematic plan view of the anthropomorphic, anatomically correct, robotic device.
Figure 1B:
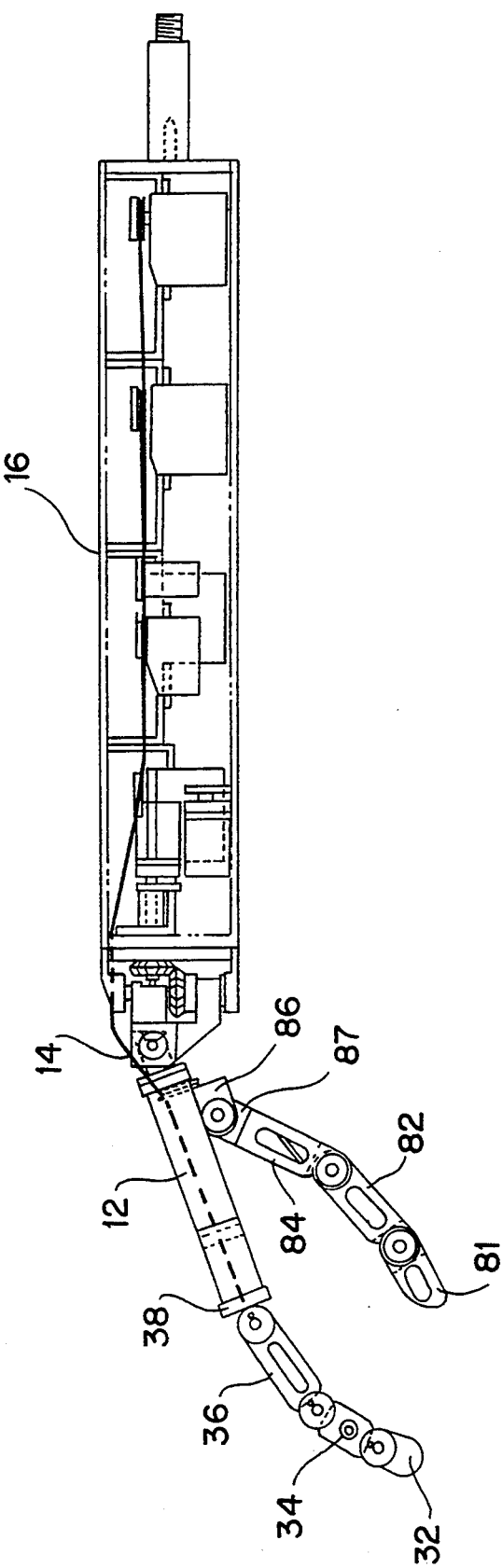
FIG. 1B represents a schematic side view of the anthropomorphic, anatomically correct, robotic device.

Referring to FIGS. 1A and 1B, hand, wrist and arm assembly of the anthropomorphic, anatomically correct, robotic device is shown generally at 10. Featured are four subcomponents of the device 10 namely, the hand 12, the wrist 14, the forearm 16, and the elbow 18. The hand 12 includes four finger digits, an index finger 24, a middle finger 26, a ring finger 28, a little finger 30 and opposable thumb digit 22, creating a total of twenty working joints. The wrist 14 functions to move the hand 12 in two axis of motion. Forearm 16 serves as a structural support for the hand 12 and houses all servo motors for the hand/wrist assembly. An elbow assembly 18 supports the forearm/wrist/hand assembly and allows revolute and axial rotation of the forearm/wrist/hand assembly. The servo motors, however, could be relocated from forearm 16 to a remote position such as mounted on a display stand as an alternate embodiment.

Figure 2:
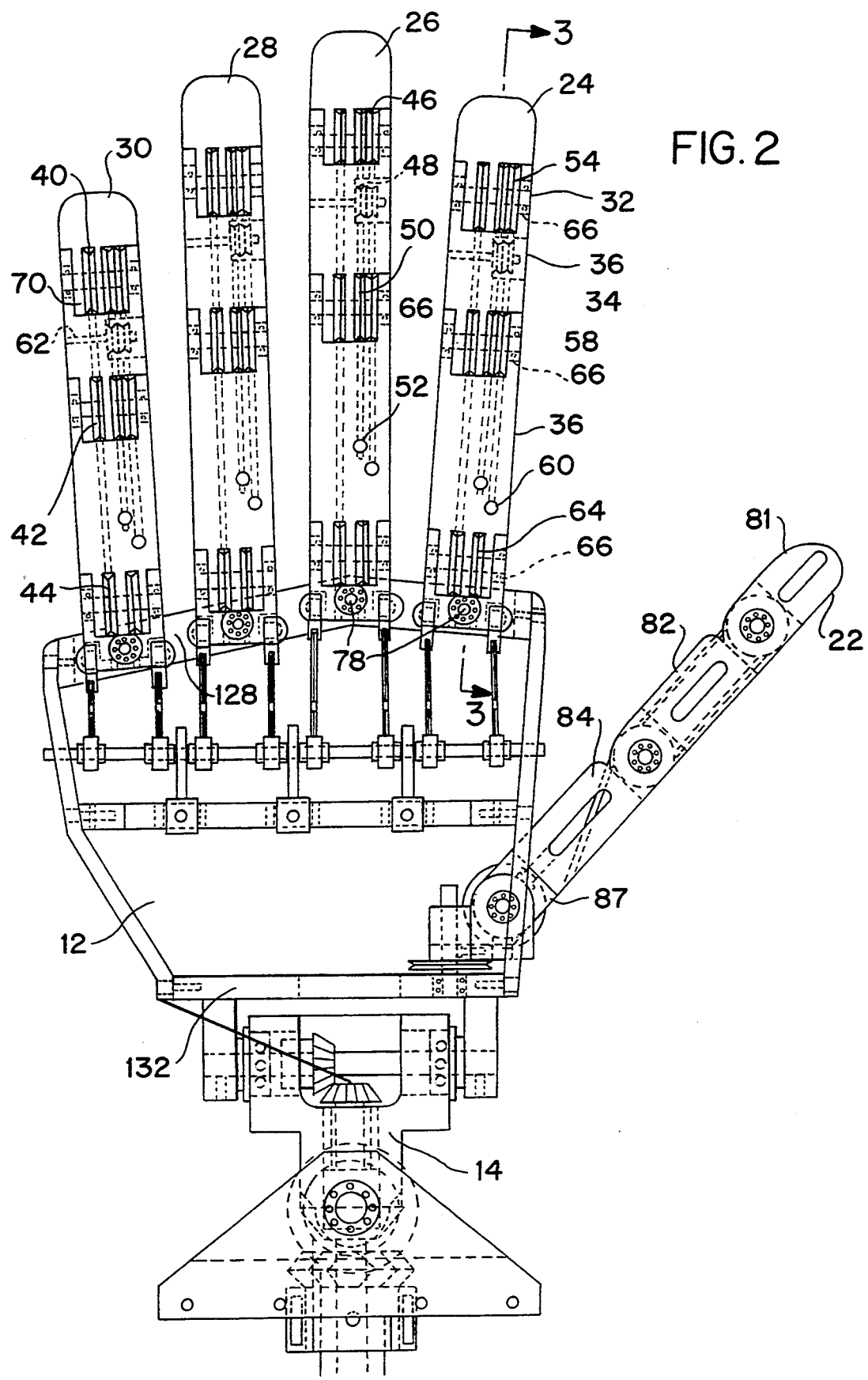
FIG. 2 depicts a detailed schematic plan view of the hand member in FIG. 1A.

A detailed schematic of the anatomical hand 12 is shown in FIG. 2. The hand 12 is comprised of the four fingers, 24, 26, 28 and 30, each finger having four degrees of motion or freedom. The fingers 24, 26, 28 and 30 are connected to a knuckle bracket 128 which is designed for accurate, anatomical positioning of the fingers. A jointed thumb 22 connected to the rear of the palm 132; thumb 22 also has four degrees of motion. Thumb 22 is located at the base of the hand 12 and is capable of rotation such that the tip of thumb 22 may opposedly contact each of the respective four fingers. Actuation of fingers 24, 26, 28 and 30 and thumb 22 is provided for by cabling that originates at a given joint, terminating at a servo motor that drives the respective joint. The fingers and thumb are anatomically proportioned such that they are modeled identically after an average human hand. Specifically, the finger and thumb members are shaped to replicate the geometric proportions of the length of the phalanges of an average human hand, such as a geometric shape that is a standard in the glove manufacturing industry. The specific size of the hand can be scaled up or down in size depending upon the needs of the user.

FIGS. 3A, 3B, 3C and 3D show the layout of a typical finger 24. Finger 24 is comprised of a distal link 32, a middle link 34, a proximal link 36 and a knuckle link 38. There are four corresponding joints interconnected by a hinge pin at the respective joint. Furthermore, distal link 32 is connected to middle link 34 via hinge pin 68, which is fit into bearings 66. Bearing 66 is a standard type bearing that is utilized frequently throughout the device to support various components. Middle link 34 is connected to proximal link 36 by hinge pin 72 which is fit into bearings 66. Proximal link 36 is connected to knuckle link 38 by hinge pin 74 which is also fit into bearings 66. Knuckle link 38 is connected to bracket 128 (Shown in FIG. 2), via hinge pin 78. Hinge pin 78 is then fit into bearings 66. In addition, the length of the first three links 32, 34 and 36 are anatomically proportioned to the length of the respective finger.

FIG. 3C is an exploded view which shows the detailed the arrangement of the components that comprise finger mechanism 24. Links 32 and 34 are joined in such manner that the two links rotate together with link 32 rotating 1.8 times as fast relative to link 34.

Figure 3A:
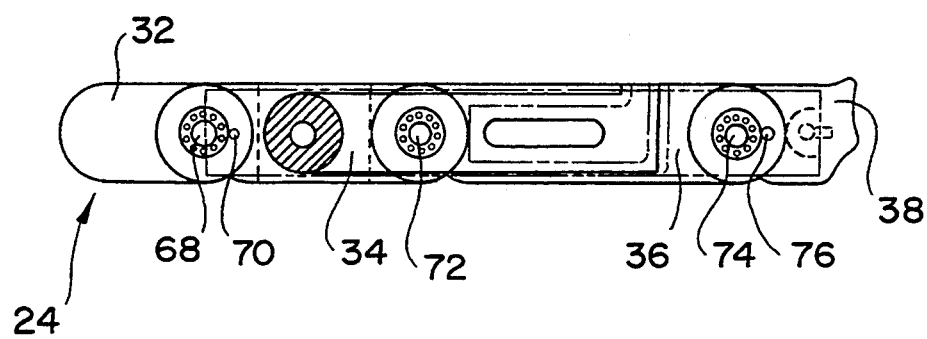
FIG. 3A is a cross-sectional view of a typical finger in FIG. 2 taken along 3—3.
Figure 3B:
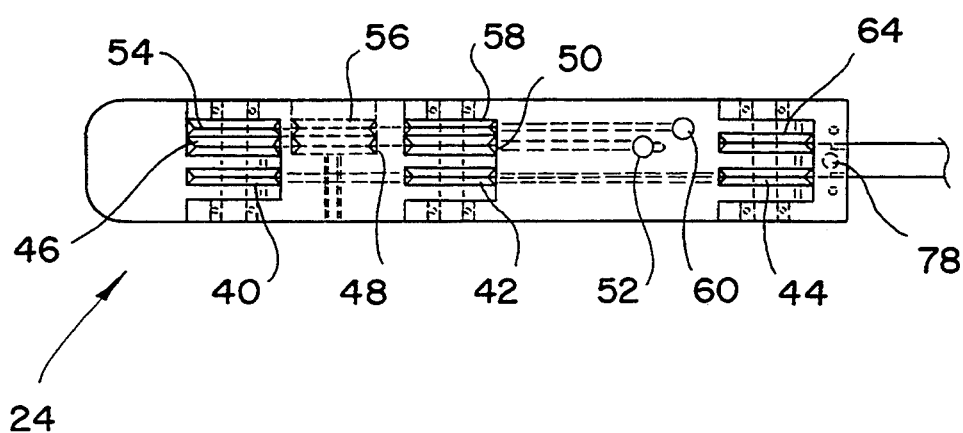
FIG. 3B is a top view of the typical finger shown in FIG. 3A.
Figure 3D:
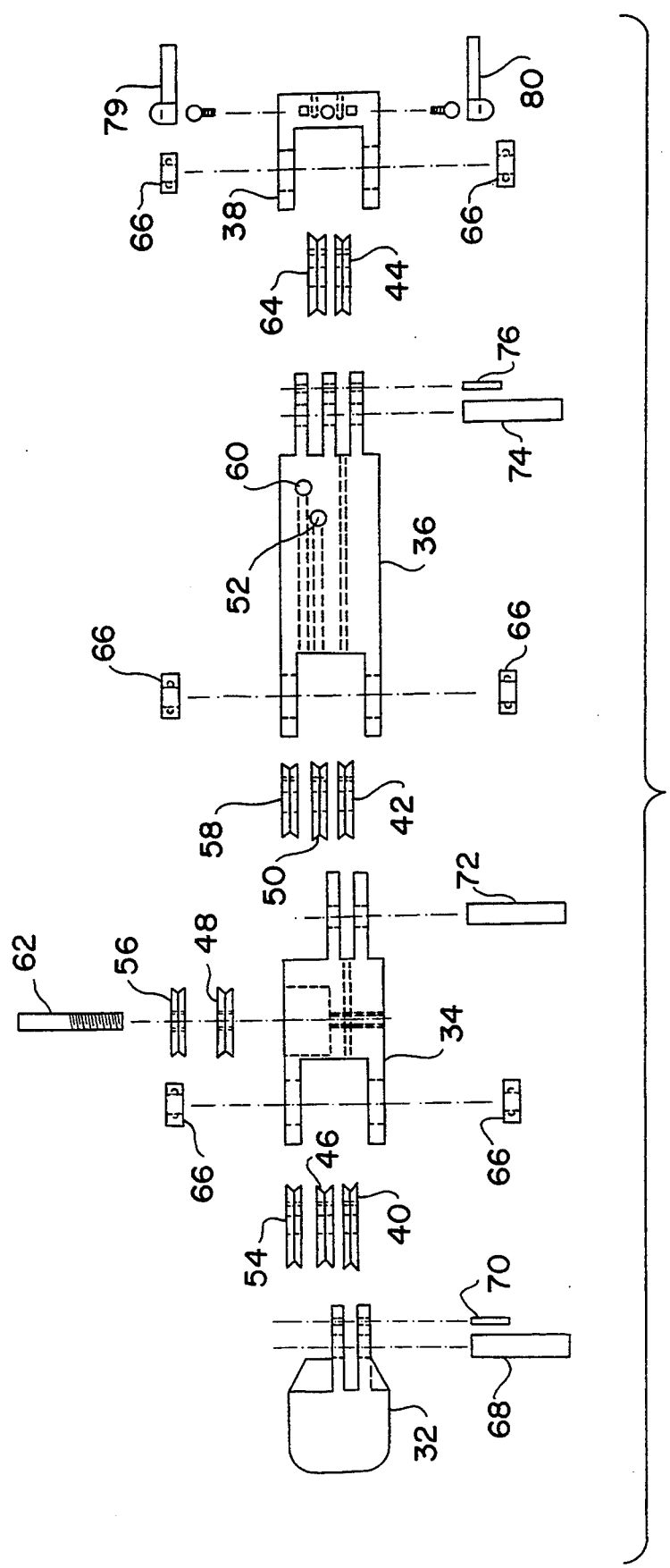
FIG. 3D is an exploded view of the components shown in FIG. 3B.

The cable routing scheme for the various cables that control the rotational bending of the links of finger 24 is illustrated in FIGS. 3A and 3E. Cables 1 and 2 are responsible for this link rotational bending scheme for links 32 and 34 during finger grasp and release. Furthermore, to facilitate grasping, cable 1 is fastened to pulley 46; pulley 46 is then attached to the distal finger link 32 by shear pin 70. Cable 1 is then fed through link 34 via pulleys 48 and 50, rotating about shafts 62 and 72 respectively. Cable 1 then passes through link 36 terminating at the top of link 36 by fastening means at aperture 52.

Figure 7A:
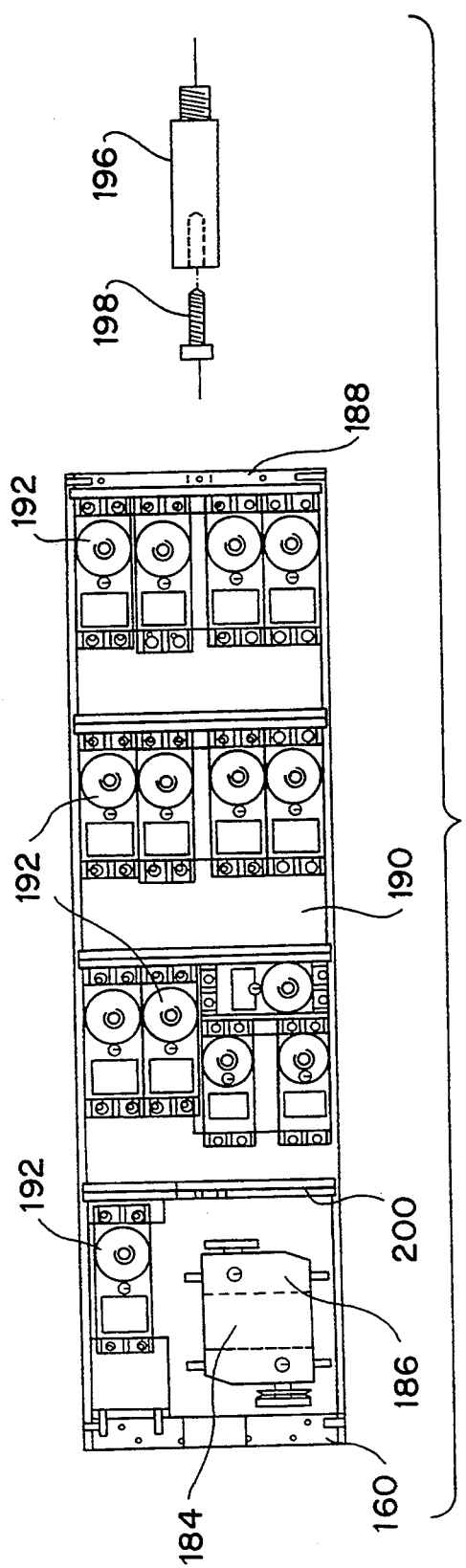
FIG. 7A represents a schematic plan view of the forearm section from FIG. 1.

To facilitate controlled rotational bending of link 32 during finger release, cable 2 is fastened to pulley 54 as shown in FIGS. 3A and 3E. Pulley 54 is attached to the distal finger link 32 by shear pin 70. Furthermore, cable 2 is fed through link 34 via pulleys 56 and 58, rotating about shafts 62 and 72 respectively. Cable 2 then passes through link 36 and terminates at the top of link 36 by fastening means at aperture 60. The rotational bending of link 32 originates with actuating cable 3. Cable 3 is fastened to drive pulley 40, and drive pulley 40 is attached to link 32 by shear pin 70. Cable 3 then passes through link 34 and over idler pulley 42 which rotates about hinge pin 72. Cable 3 then passes through link 36 and over idler pulley 44 which rotates about hinge pin 74. Cable 3 continues through link 38 and terminates at the output pulley of servo motor 192 as shown in FIG. 7A.

The rotational bending of link 36 originates with actuating cable 4. Cable 4 is fastened to drive pulley 64 which is attached to link 36 by shear pin 76. Cable 4 then passes through link 38 and terminates at the output pulley of servo motor 192 as shown in FIG. 7A.

Lateral motion of said finger linkage allowing the space between the fingers to increase and decrease is facilitated by hinge pin 78 which is fastened to link 38. Hinge pin 78 is subsequently fit into bearings 66, located in knuckle bracket 128 (shown in FIGS. 2 and 5A). Actuation of said lateral motion originates at ball and socket joints 79 and 80. Both ball and socket joints 79 and 80 are fastened to link 38. Cables 5 and 5a, which are fastened to joints 79 and 80 respectively, terminate at the output pulley of servo motor 192 as shown in FIG. 7A.

Figure 4A:
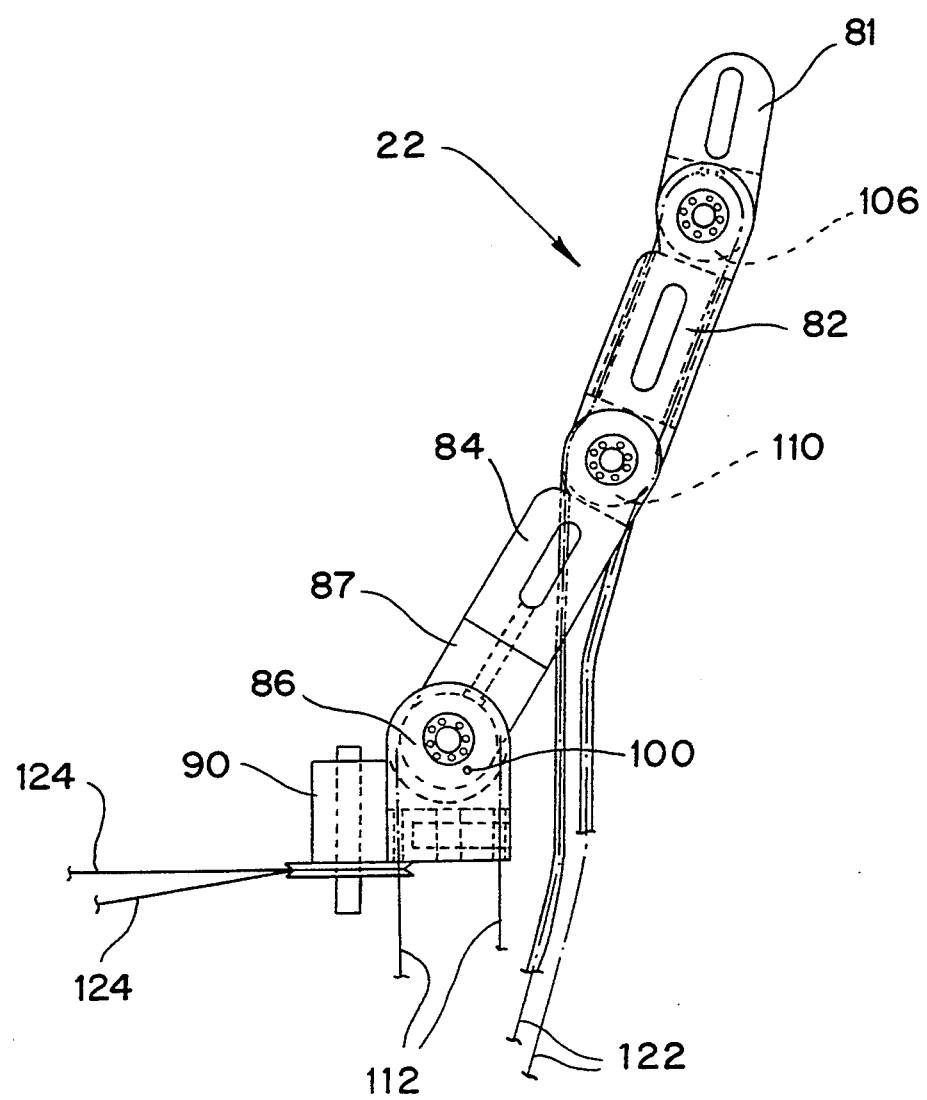
FIG. 4A is a cross-sectional view of a typical thumb including cable routing as shown in FIG. 2.

FIGS. 4A and 4B display the thumb digit 22 of the anatomical hand 12 of FIG. 2. The thumb 22 is comprised of six links which are the distal link 81, the middle link 82, lower proximal link 84, upper proximal link 87, upper base link 86, and lower base link 90. There are also four corresponding joints for the distal, middle, proximal and base links interconnected by hinge pins at each respective joint. In addition, the length of the links are anatomically proportioned to the length of the entire thumb. Link 81 is connected to link 82 via hinge pin 109, which is fit into bearings 66. Link 82 is connected to link 84 by hinge pin 105 which is fit into bearings 66. Link 84 is connected to link 87 by fastener 88. Separation of links 84 and 87 provides for the rotational bending of links 81, 82 and 84 about link 87 as a positioning aid for the end of thumb link 81. Link 87 is connected to link 86 by hinge pin 101 which is fit into bearings 66.

Link 86 is connected to link 90 by fastener 92. Separation of links 86 and 90 provides for the revolute rotation of links 81, 82, 84, 87 and 86 perpendicular to link 90 as a positioning aid for the end of thumb link 81. Link 90 is connected to support bracket 132 (Refer to FIG. 5A.) by means of hinge pin 94, which is fit into bearings 66.

Rotation of link 81 originates with actuating cable 122. Cable 122 is fastened to drive pulley 106 which is attached to link 81 by shear pin 108. Cable 122 then passes through link 82 and over idler pulley 110, which rotates about hinge pin 105. Cable 122 passes over link 84 and terminates at the output pulley of servo motor 192 as shown in FIG. 7A.

Rotation of link 82 originates with actuating cable 118. Cable 118 is fastened to drive pulley 102, which is fastened to link 82 by shear pin 104. Cable 118 passes over link 84 and terminates at the output pulley of servo motor 192 as shown in FIG. 7A.

Rotation of link 87 originates with actuating cable 112. Cable 112 is fastened to drive pulley 98 which is attached to link 87 by shear pin 100. Cable 112 then terminates at the output pulley of servo 192 as shown in FIG. 7A.

Rotation of link 90 originates with actuating cable 124. Cable 124 is fastened to drive pulley 96 which is attached to link 90 by shear pin 98. Cable 124 then terminates at the output pulley of servo motor 192 as shown in FIG. 7A.

Figure 5A:
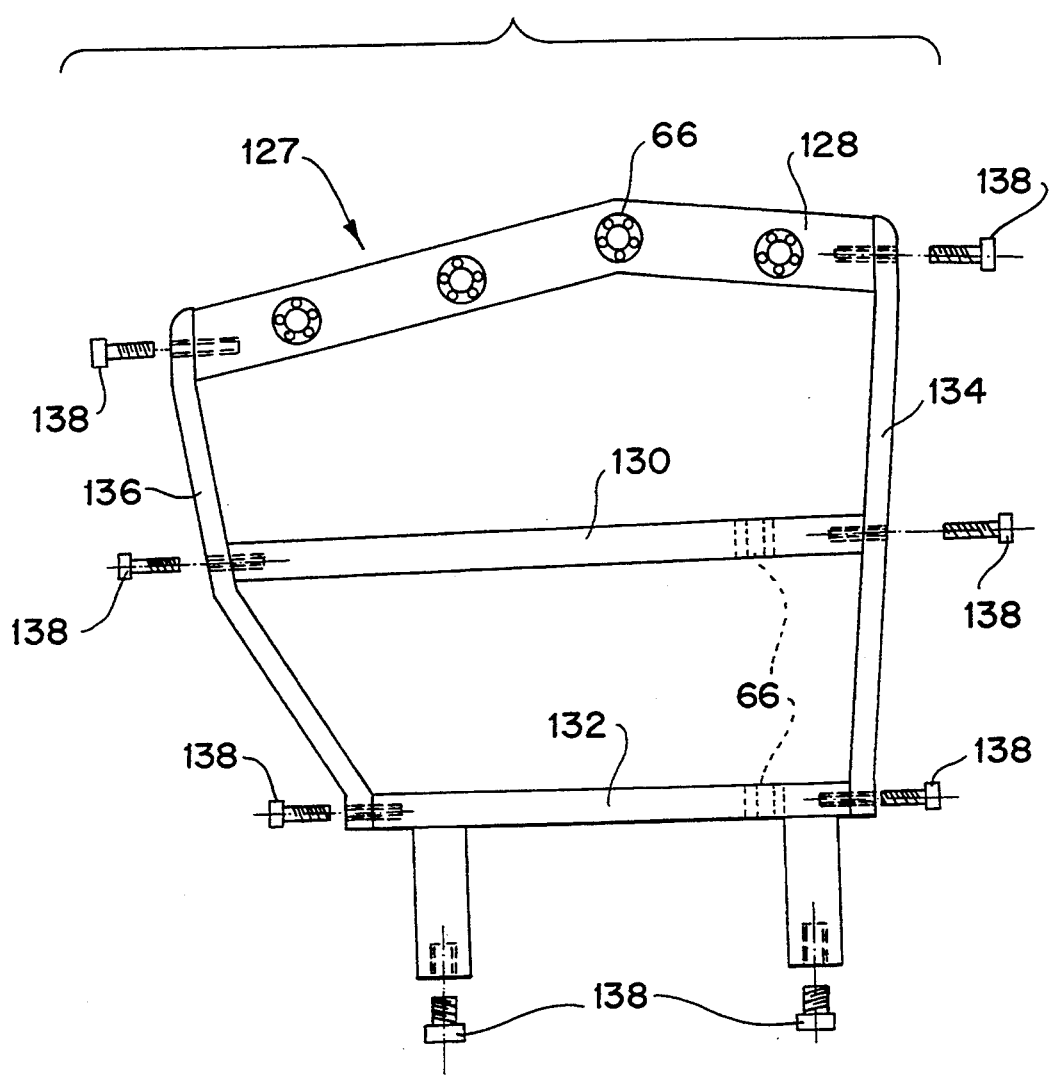
FIG. 5A is a plan view of the palm support structure for the anatomical hand shown in FIG. 2.

FIG. 5A details the palm assembly for the anatomical hand 12 shown in FIG. 2. The palm assembly 127 functions as a place holder and structural support for each of the four finger digits 24, 26, 28, 30 and the thumb digit 22. The four finger digits are rotatably hinged to the palm 127 by a hinge pin 78 (typical) of FIG. 3a which is fitted into twin bearings 66 and 66 (typical). Bearings 66 are then fit into knuckle bracket 128 which dictates the lateral and axial placement of the fingers. Knuckle bracket 128 is then connected to side support brackets 134 and 136 by fasteners 138. Middle support bracket 130 is connected to brackets 134 and 136 by fasteners 138. The rear support bracket 132 functions as a connecting means between the hand assembly 12 and wrist assembly 14. Rear bracket 132 is connected to side support brackets 134 and 136 by fasteners 138. The thumb digit 22 is rotatably hinged to bracket 132 by a hinge pin 94 which fits into bearings 66 as shown in FIG. 4A.

Figure 5B:
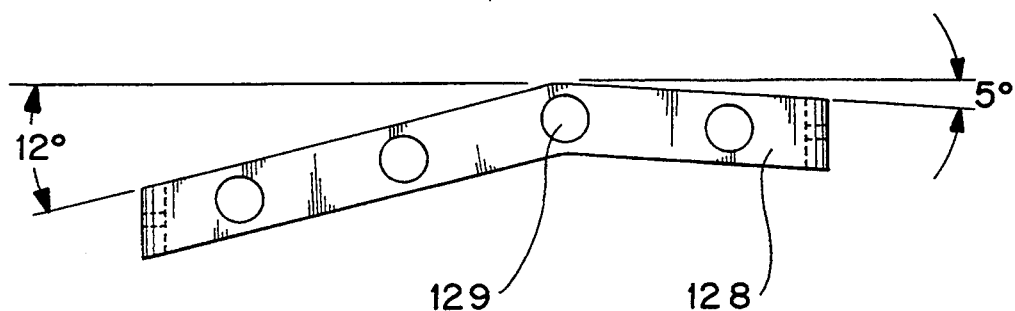
FIG. 5B is a plan view of the knuckle bracket of the palm support structure shown in FIG. 5A.
Figure 5C:
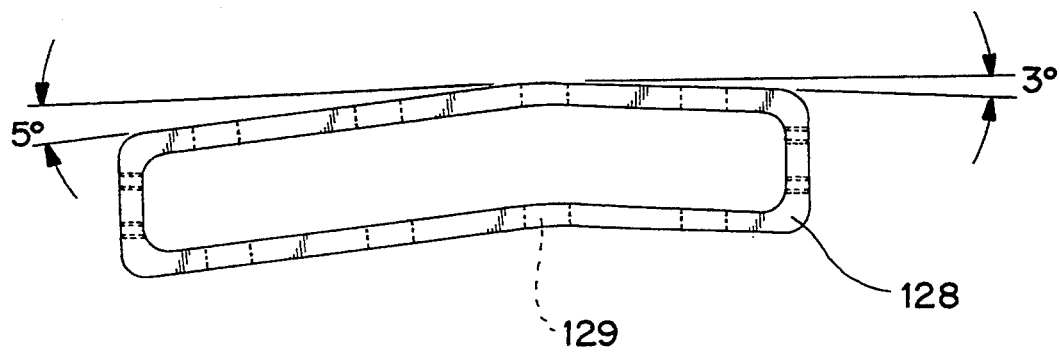
FIG. 5C is an end view of the knuckle bracket shown in FIG. 5B.

FIGS. 5B and 5C show the contour or design of knuckle bracket 128 including the angles of inclination which are critical to the anatomical design or configuration of anatomical hand 12. For the preferred embodiment, the angle of inclination is referenced from the middle finger knuckle joint 129. In FIG. 5B the angle of inclination is approximately 12 degrees to the left of the middle joint 129, and approximately 5 degrees to the right of joint 129. For FIG. 5C the angle of inclination is approximately 5 degrees to the left of the middle joint 129, and 3 degrees to the right of joint 129.

FIGS. 6A, 6B, 6C and 6D illustrate the design of the wrist assembly 14 for hand and arm assembly 10 as shown in FIG. 1. Wrist assembly 14 provides two degrees of motion (yaw and pitch) for anatomical hand 12. The wrist main body 140 houses the pitch axis output shaft 172, bevel gearset 166, bearings 168 and shims 170. Output shaft 172 is connected to the rear support bracket 132 of the palm 127 (FIG. 5A) by fastening bolts 138. Wrist main body 140 also houses support bearing 178, universal joint 176 and pitch axis input shaft 180. Bevel gear 166 is connected to universal joint 176 by fastening stud 174. Pitch input shaft 180 passes through the yaw input shaft 162, input gear 182 and support bearing 168, which fits into support bracket 200 (Shown in FIG. 7A.). Gear 182 is fitted to shaft 180 and is rotationally driven about shaft 180 by motor 186.

Yaw axis rotational shafts 148 and 150 are fastened to main body 140, with said shafts being pressed into rotational bearings 146, which fit into upper and lower support brackets 142 and 144 respectively. Yaw bevel gear 154 is fastened to yaw output shaft 150 by fastening screw 156. Yaw bevel gear 154 is fastened to yaw input shaft 162 by fastening screw 156. Input shaft 162 and yaw bevel gear 154 rotate about support bearing 158, which fits into forward forearm support 160. Yaw axis input gear 164 is fitted to yaw axis input shaft 162 and is rotationally driven about shaft 162 by motor 184.

Figure 7B:
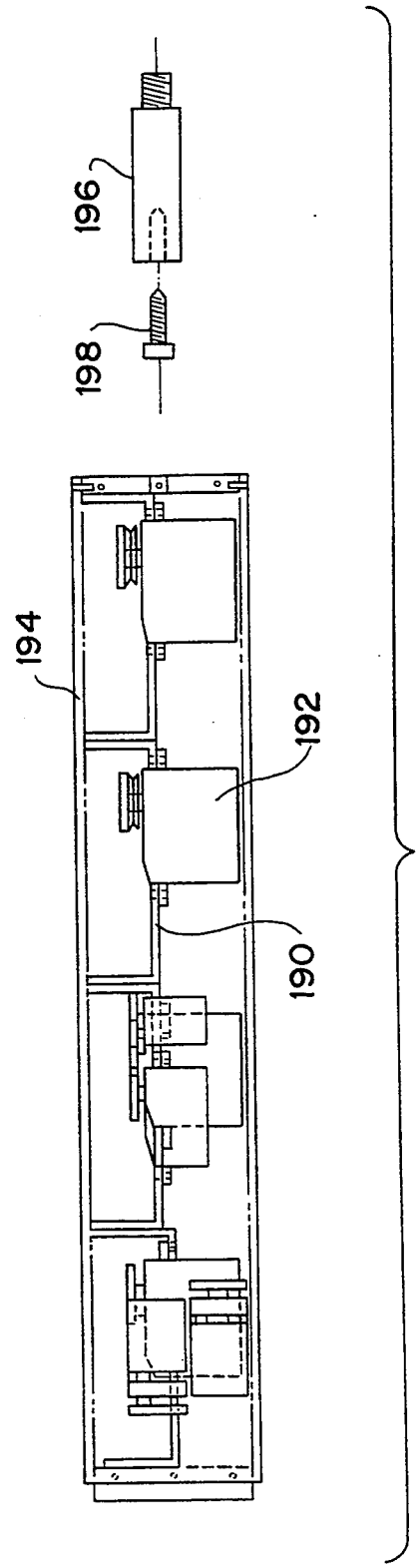
FIG. 7B represents a schematic side view of the forearm section shown in FIG. 7A.

FIGS. 7A and 7B are schematic views showing the components comprising the forearm assembly 16 of FIG. 1. Forearm assembly 16 functions to house the servo motors 192 for each of the four finger digits 24, 26, 28, 30 and the thumb digit 22, as well as house the yaw and pitch wrist motors 184 and 186. The forearm assembly 16 also provides structural support for the anatomically correct hand 12 and wrist assembly 14. The forearm assembly 16 is divided into four major sections 16a, 16b, 16c and 16d. Sections 16a and 16b house three servo motor groups, namely, the thumb, wrist and lateral finger motors. Section 16c and 16d house a servo motor group, namely, the finger digit actuating motors.

Figure 6A:
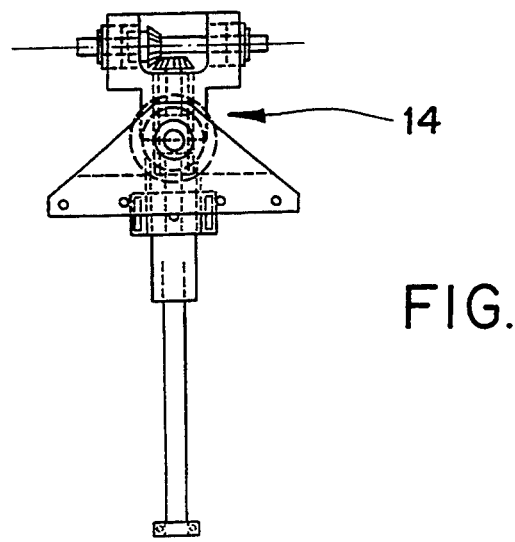
FIG. 6A is a plan view of the wrist assembly of FIG. 1.
Figure 6B:
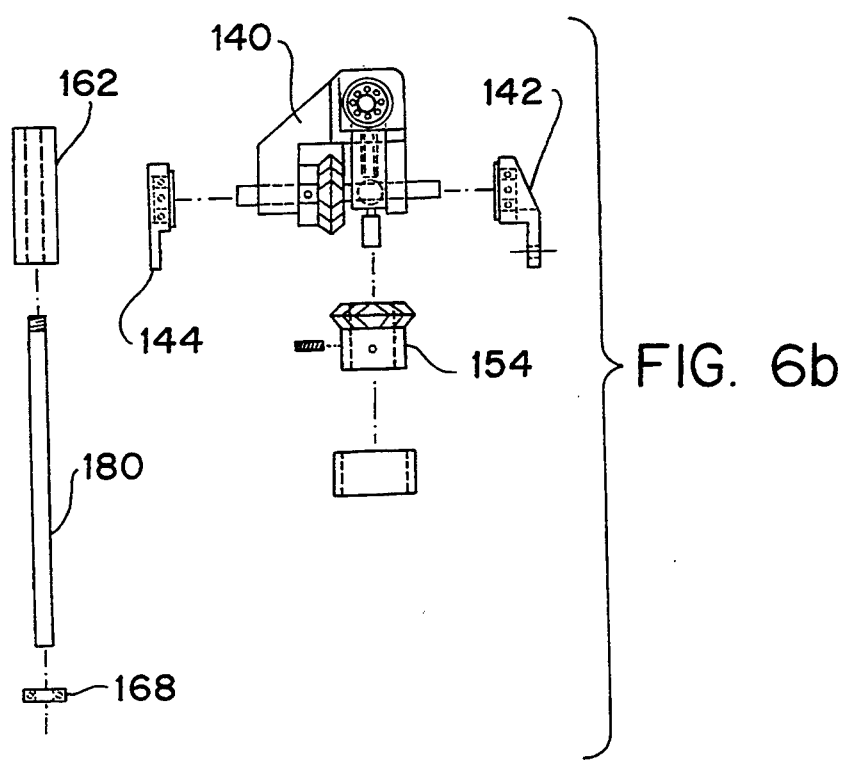
FIG. 6B is a partially exploded side view of the wrist assembly as shown in FIG. 6A.
Figure 6C:
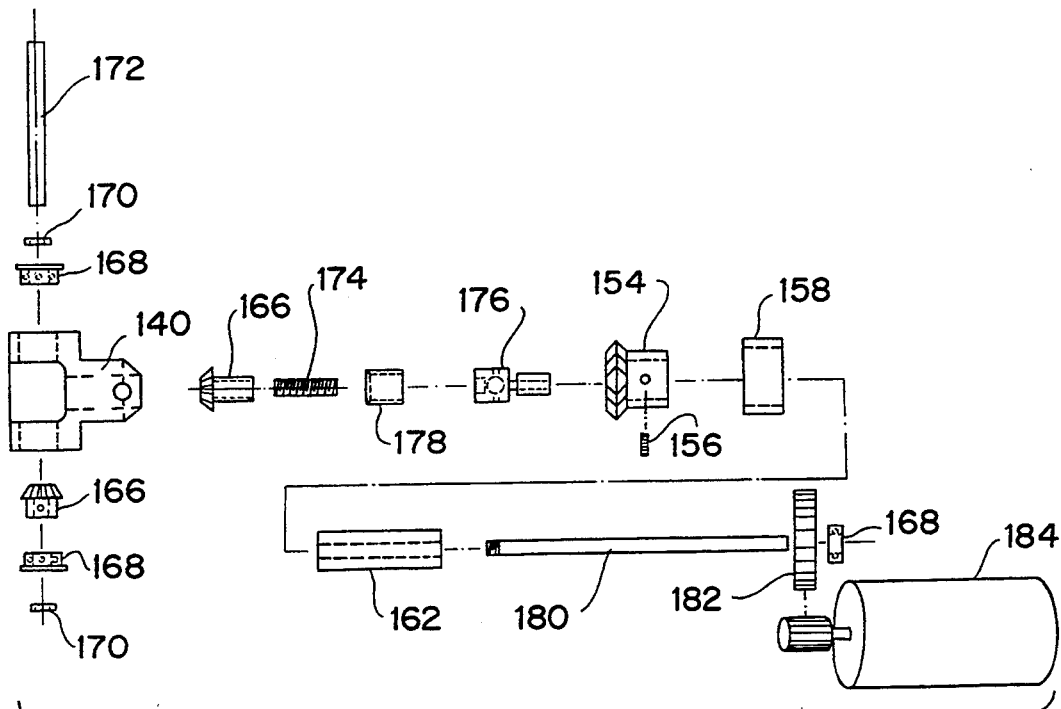
FIG. 6C is a detailed exploded view of the components shown in FIG. 6A.
Figure 6D:
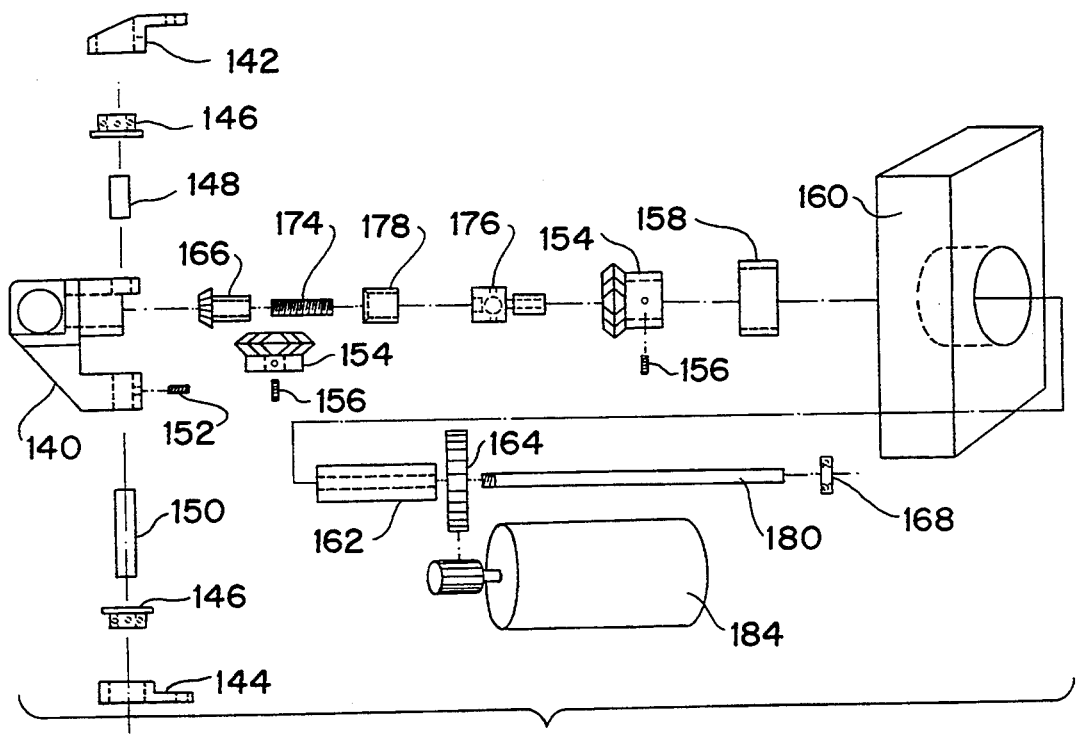
FIG. 6D is a detailed exploded view of the components shown in FIG. 6A.

The forward forearm support 160 functions as the fastening support for the upper and lower wrist support brackets, 142 and 144 as shown in FIG. 6D. The servo motors are then fastened into the servo housing 190 at their respective locations. The forearm support shaft 196 is then fastened to the rear forearm support 188 by fastening bolt 198.

Figure 8A:
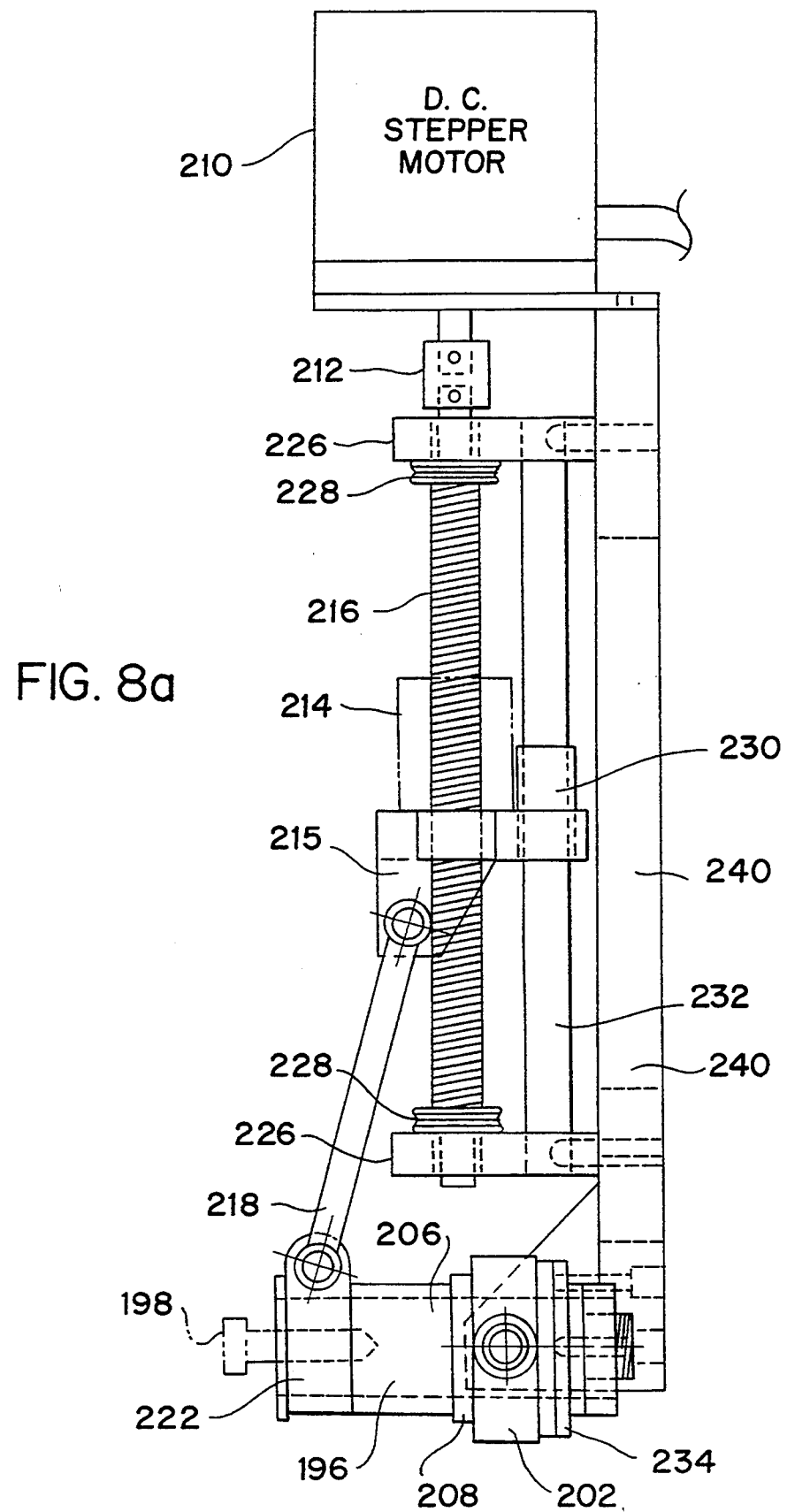
FIG. 8A is a plan view of the elbow assembly shown in FIG. 1.
Figure 8B:
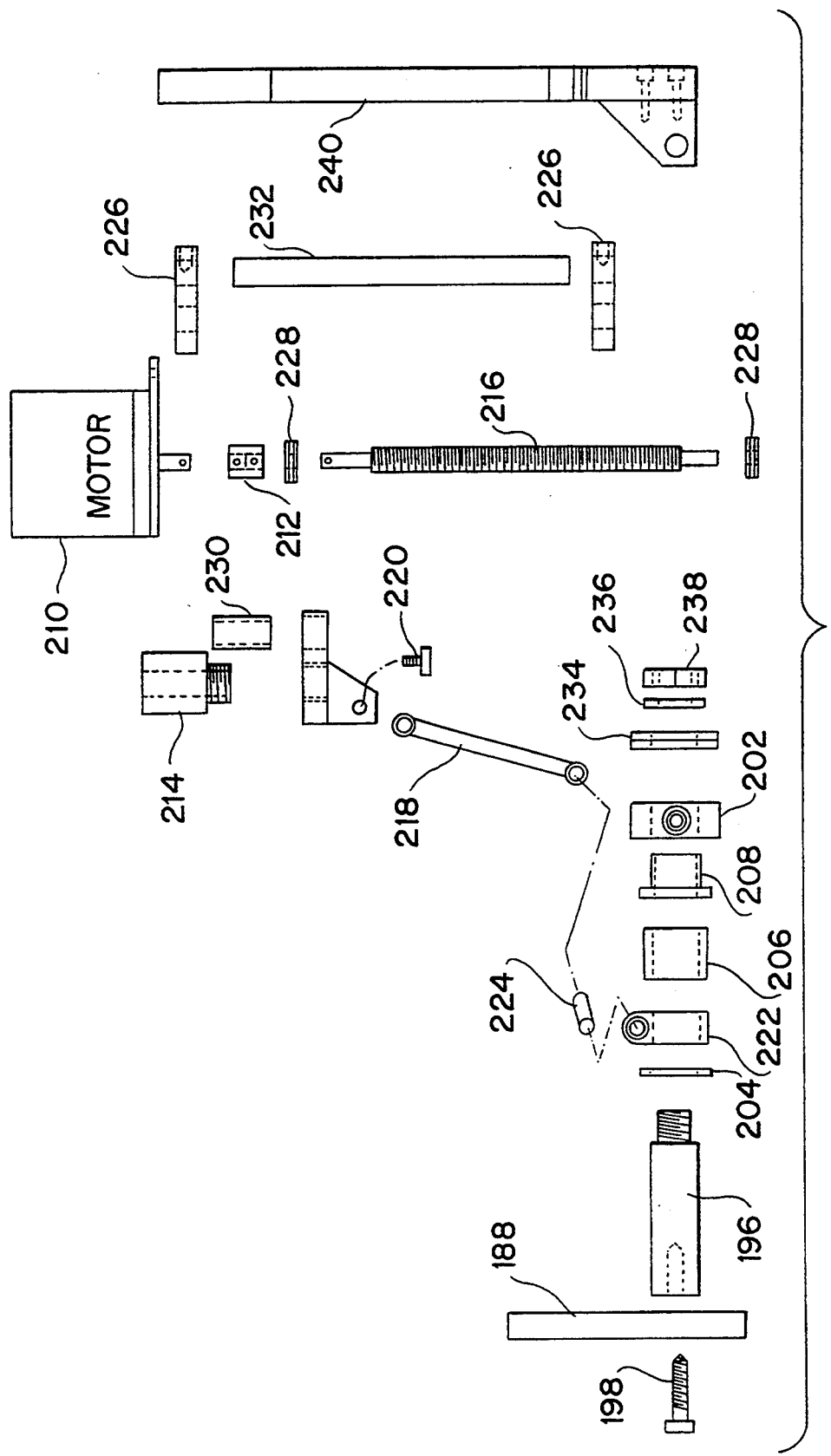
FIG. 8B is an exploded view showing the components of the elbow assembly of FIG. 8A.

FIGS. 8A and 8B are schematic views showing the components of the elbow mechanism 18 as shown in FIG. 1. Essentially, the forearm housing 16 is connected to the elbow mechanism 18 by forearm support shaft 196, which passes through and rotates about shim 204, pivot flange 222, spacer 206, bushing 208, pivot block 202, thrust bearing 234 and shim 236. This assembly is held together by nut 238. Furthermore, pivot block 202 is pivotally mounted to elbow assembly support bracket 240, allowing the forearm assembly 16 to pivot about fixed bracket 240.

Actuating motion for the rotation of the forearm assembly 16 originates with motor 210 fastened to threaded shaft 216 by coupling 212. Motor 210 and threaded shaft 216 are held in position by pillow blocks 226 which are fixed to the elbow assembly support shaft 240. Axial forces acting upon shaft 216 are relieved by thrust bearings 228, located at the end of shaft 216. Ball bearing nut 214 travels up and down shaft 216 as shaft 216 rotates. Spinning motor 210 is the driver which causes shaft to rotate. Nut 214 is housed in mounting bracket 215 which supports connecting link 218. Mounting bracket 215 and connecting link 218 are fastened together by shoulder bolt 220. Connecting link 218 is then pivotally hinged to pivot flange 222 by a connecting pin 224. Lateral support of lead screw assembly 214 and 216 is provided by linear bushing 230 which is fixed to housing 215. Linear bushing 230 then slides over shaft 232 which is fixed to pillow blocks 226.

Figure 10:
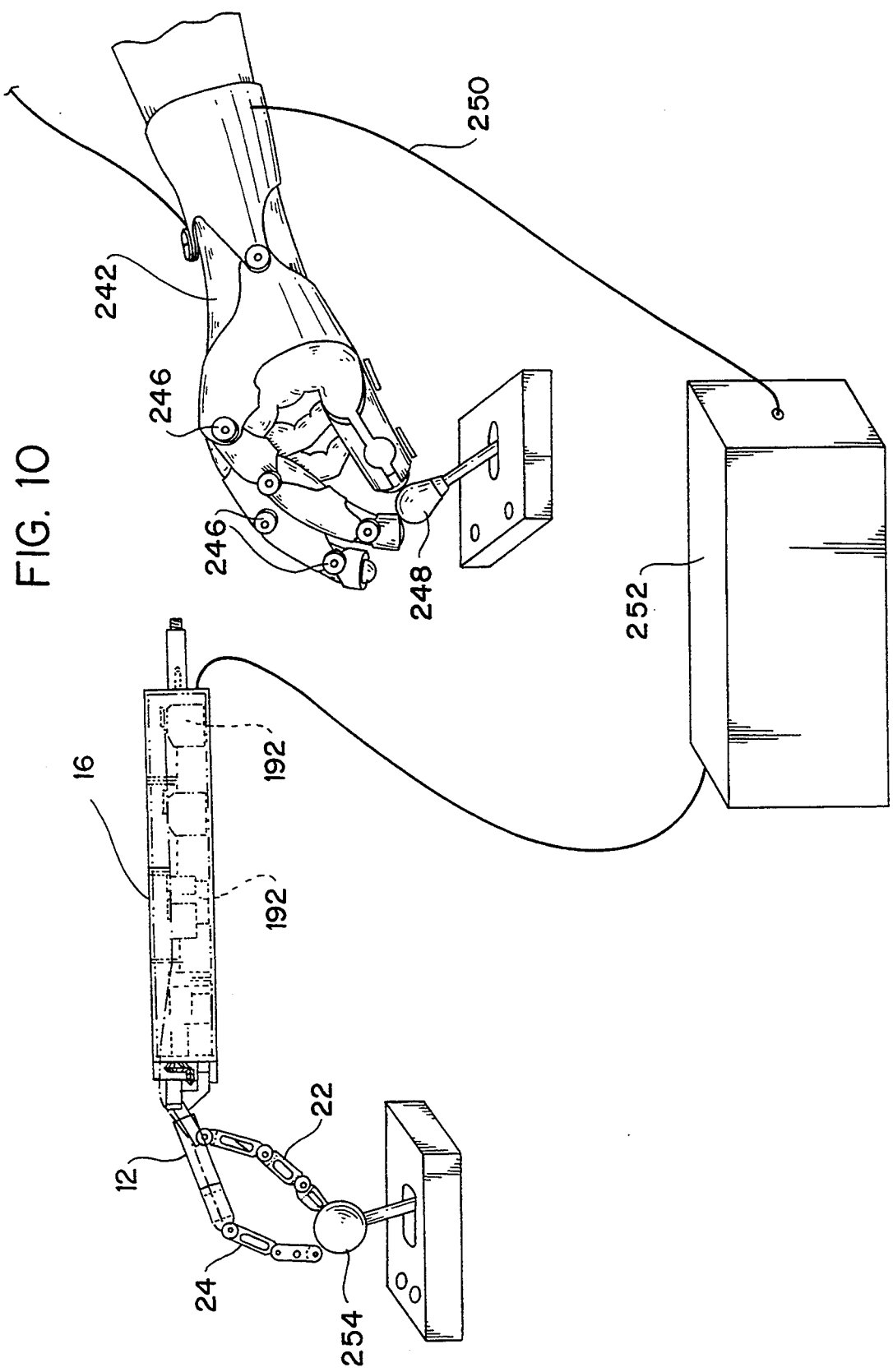
FIG. 10 is an illustration showing an operator using the anatomical hand to grasp an object.

To guide the mechanical hand, an operator places his hand 242 inside a "teachglove" 244 as shown in FIG. 9. "Teachglove" 244 is an exoskeletal device that covers the contour of the operator's hand 242 and "teachglove" 244 has sensors or potentiometers 246 positioned about its periphery. These sensors 246 monitor the operator's finger-joint positions as the operator moves his fingers, hand or wrist to whatever position is desired to perform some hand manipulation such as grasping and/or manipulating an object such as control lever 248. Sensors 246 then send electrical signals via cable 250 to a controller 252 as shown in FIG. 10. As the operator performs this hand manipulation, the electrical signals are sent to the servo motors 192 of forearm 16 to actuate the cables that control the movement of the mechanical hand assembly 12. Duplicate motion from the mechanical hand 12 is then achieved due to its anatomically correct linkages and exoskeletal input. Therefore, a remotely located object such as control lever 254 can be controlled and/or manipulated with precision by mechanical hand assembly 12 as mechanical hand 12 mimics the movement of the operator's hand 242. This remote control feature would be extremely useful as a manipulator arm for submersibles, spacecraft, or hazardous or nuclear environments.

The controller 252 shown in the preferred embodiment is a real time controller; however, controller 252 could be computerized. Manipulator control would then have three levels: analog teaching for real time control, analog teaching to a computer such as a personal computer for motion record or replay, and digital motion control using traditional robotic programming methods.

By providing the anatomically correct, humanlike, mechanical hand and arm that an operator can control and guide using a "teachglove", it is now possible to guide and control a robotic hand, that identically resembles a human hand, with nearly the precise control, dexterity and compliance of a human hand.

It will be understood by those skilled in the art that the embodiments shown and described are only exemplary and that various modifications can be made in the practice of the invention within the scope of the appended claims.

Having described my invention, I claim:

1. A dexterous robotic arm comprising:
    a hand section, a wrist section including an articulated wrist joint, and a forearm section;
    said hand section comprising; four flexible fingers, a thumb, and a palm member;
    said fingers including an index finger, a middle finger, a ring finger and a little finger, each being comprised of a distal link, a middle link, a proximal link and a knuckle link,
    said thumb being comprised of a distal link, a middle link, a proximal link and a base link;
    said fingers, thumb, and the links thereof being respectively sized to replicate the geometric proportions of the length of the digital phalanges of a human hand;
    said palm member comprising, a knuckle bracket for mounting said four flexible fingers thereon, an inner and outer side bracket, said thumb being attached to said inner side bracket, and a wrist bracket attached to said articulated wrist joint;
    said wrist joint being pivotally attached to said wrist bracket by attachment means such that it is able to rotate said palm member in elevation and being pivotally attached to said forearm section by attachment means such that it is able to rotate laterally with respect to said forearm section about a pivot on said forearm section;
    said knuckle bracket includes a middle finger mounting point and when said hand section is viewed from above, said knuckle bracket includes a relatively shorter and a relatively longer bracket segment, each including respective finger mounting points and extending rearwardly from said middle finger mounting point toward said wrist bracket;
    said knuckle bracket further, when said hand section is viewed from the front, is inclined downward on each side of said middle finger mounting point;
    each said flexible finger further including three bending joints connecting its links and thereby allowing it to rotationally bend upwardly and downwardly at these joints and being pivotally attached to said knuckle bracket of said palm member by attachment means such that it is able to rotate laterally whereby the space between the flexible fingers increases and decreases;
    said thumb further including three bending joints connecting its links and thereby allowing it to rotationally bend at each joint and being located adjacent said wrist joint on said inner side bracket by a rotatable base joint which allows said thumb to sweep under said palm member so as to oppose a tip portion of a predetermined finger of said flexible fingers,
    said proximal link of said thumb additionally comprising a first pair of mutually rotatable link sections for providing a first angular adjustment of said thumb, and wherein said base link of said thumb comprises a second pair of mutually rotatable link sections for providing a second angular adjustment of said thumb, and wherein said first pair of link sections of said proximal link of said thumb comprises a mutually aligned lower proximal link section and an upper proximal link section and said second pair of link sections of said base link of said thumb comprises a mutually offset lower base link section and an upper base link section and wherein said lower proximal link section is connected to said middle link at a first of said three bending joints, said upper proximal link section is connected to said upper base link section at a second of said three bending joints, and said lower base joint section is connected to said rotatable base joint; and
    drive means coupled to each of said sections for effecting controlled movement of said sections, said drive means further comprising servo motors and cabling means coupled to said hand section and to each said link of said flexible fingers and thumb at one end and coupled to said servo motors at the opposite end, wherein said servo motors, when actuated, cause said cabling to push/pull and thereby move said hand section, said flexible fingers, and said thumb.

2. The dexterous robotic arm as recited in claim 1 and additionally including means for controlling said drive means.

3. The dexterous robotic arm as recited in claim 1 wherein said means for controlling said drive means comprises:
    an exoskeletal teaching glove having the shape and characteristics of a human hand and having sensors positioned about the periphery of said exoskeletal teaching glove, wherein said sensors monitor an operator's wrist, hand and finger-joint movements;
    actuator means for actuating said servo motors; and means for sending monitored signals from said sensors to said actuator means, whereby said hand section and said wrist section mimic the movement of said exoskeletal teaching glove.

4. The dexterous robotic arm as recited in claim 2 wherein said means for controlling said drive means is an analog mechanism operating under real time conditions.

5. The dexterous robotic arm as recited in claim 2 wherein said means for controlling said drive means is an analog mechanism coupled to a personal computer that will enable at least one of a motion record and replay for said hand section.

6. The dexterous robotic arm as recited in claim 1 wherein said distal link of said fingers rotationally bends at an outermost joint of said three joints at a first rate of rotation, said middle link rotationally bends at an intermediate joint of said three joints at a second rate of rotation and wherein said first rate of rotation is equal to or greater than said second rate of rotation.

7. The dexterous robotic arm as recited in claim 1 wherein said shorter bracket segment has a first angle of inclination referenced from a horizontal line passing over said middle finger mounting point when said hand section is viewed from above and said longer bracket segment has a second angle of inclination referenced from said horizontal line, and wherein said second angle is greater than said first angle.

8. The dexterous robotic arm is recited in claim 7 wherein said second angle is at least equal to twice said first angle.

9. The dexterous robotic arm as recited in claim 8 wherein said first angle is at least equal to approximately 5° and said second angle is at least equal to approximately 12°.

10. The dexterous robotic arm as recited in claim 1 wherein said hand section, when viewed from the front, is inclined downward on one side of said middle finger mounting joint by a first angle referenced from a horizontal line passing over said middle finger mounting point and inclined downward on the other side of said middle finger mounting joint by a second angle referenced from said horizontal line and wherein said first angle is less than said second angle.

11. The dexterous robotic arm as recited in claim 10 wherein said first angle is at least equal to approximately 3° and said second angle is at least equal to approximately 5°.

12. The dexterous robotic arm as recited in claim 1 wherein said attachment means to said wrist bracket for rotating the wrist joint upwardly and downwardly comprises a gear assembly.

13. The dexterous robotic arm as recited in claim 12 wherein said gear assembly comprises a bevel gear assembly.

14. The dexterous robotic arm as recited in claim 1 and additionally including a motor driven elbow section coupled to said forearm section for rotating said forearm section about a central longitudinal axis passing through said forearm section.

* * * * *